United States Patent [19]

Jache

[11] Patent Number: 4,929,251

[45] Date of Patent: May 29, 1990

[54] METHOD FOR PRODUCING LEAD ACCUMULATOR WITH THIXOTROPIC GEL

[76] Inventor: Otto Jache, Am Molkenborn 73, D-6470 Budingen 1, Fed. Rep. of Germany

[21] Appl. No.: 306,217

[22] Filed: Feb. 3, 1989

Related U.S. Application Data

[63] Continuation of Ser. No. 23,126, filed as PCT EP86/00346 on June 10, 1986, published as WO86/07496 on Dec 18, 1986, abandoned.

[30] Foreign Application Priority Data

Jun. 13, 1985 [DE] Fed. Rep. of Germany ....... 3521200

[51] Int. Cl.$^5$ ............................................ H01M 10/10
[52] U.S. Cl. .................................... 29/623.5; 429/190
[58] Field of Search ....................... 429/190, 189, 188; 29/623.5

[56] References Cited

U.S. PATENT DOCUMENTS

| | | | |
|---|---|---|---|
| 1,417,007 | 5/1922 | Williams | 204/2.1 |
| 1,634,850 | 7/1927 | Powers | 429/190 |
| 3,172,782 | 3/1965 | Jache | 429/190 X |
| 3,180,760 | 4/1965 | Rauter | 204/2.1 |
| 3,457,112 | 7/1969 | Reber | 429/190 |
| 3,711,332 | 1/1973 | Bastacky | 429/190 X |
| 3,765,942 | 10/1973 | Jache | 429/190 |
| 3,776,779 | 12/1973 | Johnson | 429/190 |
| 3,862,861 | 1/1975 | McClelland et al. | 429/94 X |
| 4,391,036 | 7/1983 | Kishimoto et al. | 429/190 X |
| 4,414,302 | 11/1983 | Jache et al. | 429/190 |

FOREIGN PATENT DOCUMENTS

| | | |
|---|---|---|
| 1273640 | 7/1968 | Fed. Rep. of Germany . |
| 1671693 | 12/1971 | Fed. Rep. of Germany . |
| 1194015 | 11/1973 | Fed. Rep. of Germany . |
| 3041953 | 6/1982 | Fed. Rep. of Germany . |
| 8236634 | 6/1983 | Fed. Rep. of Germany . |
| 391807 | 9/1965 | Switzerland . |
| 1366030 | 9/1974 | United Kingdom . |

Primary Examiner—Anthony Skapars
Attorney, Agent, or Firm—Robert J. Koch

[57] ABSTRACT

The invention relates to a lead accumulator with a thixotropic gel consisting primarily of sulphuric acid and a gel former as an electrolyte, whereby the electrolyte consists of two different phases, a liquid, gel former-free phase, by which essentially the pores of the active materials are filled in, a solid phase, as a thioxotropic gel, by which the electrolyte space especially between the electrodes, is filled up. Both phases merge in the zone of the pores of the separators, which are arranged about the electrodes. Arranged in relation to the electrodes as separators are fibrous, non-woven materials, woven textile fabrics or other flexible, porous surface structures with capillary-active properties, that cover the entire surfaces of the electrodes without separation. The electrodes are retained in their positions by means of spacers.

The partial electrolyte present as thixotropic gel contains as gel former 6-15% preferably 8-12% of a pyrogenically produced silicic acid, the particle size of which measures 0.01-0.1 microns, preferably 0.01-0.02 microns.

According to the process for producing the accumulator set forth in the invention,
  (a) in a first step, the pores of the active materials in the electrodes and the pores of the separators arranged in relation to the electrodes are impregnated with a sulphuric acid-containing electrolyte that is free of gel formers and
  (b) in a second step, the spaces remaining empty between the electrodes including the remaining electrolyte space are filled up with a thixotropic gel as electrolyte that consists essentially of sulphuric acid and a gel former.

6 Claims, No Drawings

METHOD FOR PRODUCING LEAD ACCUMULATOR WITH THIXOTROPIC GEL

This application is a continuation of application Ser No. 023,126 filed as PCT EP86/00346 on June 10, 1986, published as WO86/07496 on Dec. 18, 1986, now abandoned.

The invention relates to a lead accumulator featuring as an electrolyte a thixotropic gel consisting essentially of sulphuric acid and a gel former, as well as a method for its production.

BACKGROUND OF THE INVENTION

Such a lead accumulator with a thixotropic gel for an electrolyte, has for example been described in Swiss Patent Specification 391 807. Treated in this specification is a position-independent accumulator of limited auto-discharge capability possessing a fixed electrolyte, which remains gas tight during operation, characterized in that for the purpose of solidification, substances capable of forming a thixotropic gel are added to the electrolyte, whereby in order to facilitate pouring, the thixotropy of the gel permits the temporary liquefaction of the electrolyte. It is assumed that at the moment of filling, the particles of gel former in the zone concerned, in which there is no re-formed gel, are already associated to such an extent that the particles in direct contact with the active material are no longer capable of penetrating its narrow pores.

The lead accumulators described in CH-PS 391 807, however, have the disadvantage that only relatively small electrodes, small particularly with respect to surface area, can be employed. The reason for this situation is that the liquified form of the thixotropic gel begins at the moment of filling to revert to a solid gel. The resulting steady increase in viscosity increasingly hinders the flow of electrolyte into the less accessible regions of the cells, the result of which being that the cell completely stops functioning. For this reason, the capacity of these accumulators has been limited to approx. 20 amperehours.

Another disadvantage of the accumulators described in CH-PS 391 807 is that the introduced thixotropic gel, in the manner of a liquid electrolyte, first completely covers the active materials of both electrodes, whereafter it enters the pore entrances in the active materials. What results is a loss of performance at both electrodes. With regard to the negative electrodes, the consumption of oxygen produced at the positive electrode that is so important for the maintenance-free operation of long life batteries is first entirely prevented at the negative electrode. The three phase boundary system, i.e. gasiform, liquid and solid, can begin to develop only after the gel has fissured sufficiently to occasion considerable water loss. Because the gel is extremely difficult to extract from the pore channels, as a result of which the entire surface of the negative mass cannot be covered, oxygen consumption remains limited.

In German Patent Specification 1 671 693, is described another lead accumulator with a thixotropic gel as an electrolyte, which because of the employment of antimony-free alloys for the mass support of the electrodes also permits maintenance-free operation. Moreover, due to the simultaneous employment of silicic and phosphoric acids in the electrolyte, high cycle integrity is attained, which is even greater than that found in a comparable lead accumulator featuring antimony-filled mass supports. In the production of this accumulator, dry, charged plates are installed in the cells. Before filling, the cell containers are emptied. The thixotropic electrolyte rendered temporarily liquid for the purpose of filling is poured in under a vaccuum, whereafter the cell containers are again aerated.

Compared with the extraordinary extension to the lifetime of the battery granted by the simultaneous employment of silicic and phosphoric acids, especially during the unload/load cycle, the filling process that is speeded up through evacuation and aeration does not offer any special advantages with respect to the sizes of electrodes that may successfully be employed. With regard to loss of performance at both electrodes and the oxygen consumption at the negative electrode, there is only further deterioration.

In DE-PS 30 41 953, a lead accumulator is described, that besides featuring a thixotropic gel as an electrolyte, permits the installation of electrodes of any size. The delimiting of the flow paths for the electrolytes is avoided inasmuch as, for the filling of the cells, an electrolyte is used, that by reason of its composition neither represents a thixotropic gel nor can form one. The filling electrolyte contains however all the gel former required to develope a sufficiently solid gel. It likewise contains sulphuric acid, but in such a weak concentration that independent gel development can occur neither during filling nor thereafter.

The sulphuric acid required for gel formation is electrochemically bound in the active material of the electrodes. Formation of the thixotropic gel can take place only by means of a charging procedure that frees the bound sulphuric acid.

The filling electrolyte according to DE-PS 30 41 953 possesses exceptional flow properties. Its viscosity is similar to that of a gel-free electrolyte, since the discrete particles of the gel former are only slightly associated, or not at all. This, however, has the disadvantage that the gel former is able to penetrate deeper into the pores of the active material than is usually the case with a temporarily liquefied thixotropic gel, the result of which is, necessarily, a loss of efficiency at the affected electrodes. There is furthermore the disadvantage that due to direct contact with the thixotropic gel, oxygen consumption at the negative electrode, a factor so important for maintenance-free cell operation, is at first completely disrupted; it later returns, but with difficulty.

SUMMARY OF THE INVENTION

The invention seeks therefore to solve the problem of developing a lead accumulator of the type first mentioned that is leakproof, maintains a regular cycle, requires no servicing, and whereby the pouring of a temporarily liquified thixotropic gel into the electrolyte space between the electrodes occurs independently of the dimensions and surface area of the electrodes by virtue of a method whereby direct contact of the gel with the surface of the electrodes is precluded, as a result of which the penetration of the gel former into the pores of the active material and the covering of the pore entrances of the negative material is avoided.

This problem is solved according to the invention by virtue of the distinguishing features contained in claim 1. Further embodiments of the invention are presented in the sub claims.

The special features of a lead accumulator according to the invention owe their existance to the fact that the electrolyte that consists primarily of sulphuric acid and a gel former is subdivided into two different phases. The first of these phases is liquid, and entirely free of gel formers. The second phase is solid and is present as a thixotropic gel. The liquid phase of the electrolytes is essentially limited to the active materials of the electrodes and the adjacent portions of the separators installed in relation to the electrodes, in whose pores the electrolyte remains due to capillary action. The solid phase, present as a thixotropic gel, fills out the electrolyte space particularly between the electrodes; in this case, however, the portion of the zone occupied by the separators arranged near the electrodes is also filled, which zone faces the electrolyte space. Both electrolyte phases completely fill the pores of the separators that are arranged in relation to the electrodes, so that an unbroken and intimate transition is formed between both phases. Direct contact of the gel with the electrodes is, however, completely prevented. The pores and pore entrances of the active material therefore remain gel-free. Thus equipped, the accumulator exhibits on the one hand a performance profile typical of lead accumulators filled with liquid electrolyte, while on the other hand freely retaining the advantages of an accumulator with a thixotropic gel as electrolyte and moreover permits an extension of maintenance-free operation.

Materials suitable for employment as separators to accompany the electrodes are formed fibre fabrics as well as textile weaves or other porous surface structures of electrolyte-resistant materials, which are sufficiently flexible to be able to fully cover the electrodes without separations. In order to keep the liquid portion of the electrolyte in its pores and in contact with the active material, these separators must also possess a sufficient capillarity. Particularly advantageous are separators with pores of varying diameters, which separators in addition to having many small pores or narrow capillaries possess a small number of larger pores, which in the presence of a limited volume of electrolyte are not capable of retaining the electrolyte by capillary action and thus allowing gases free entry. The last-named separators are particularly suited for covering the negative electrodes, so that on its surface can be formed a three-phase boundary, to facilitate and speed the consumption of the oxygen produced at the positive electrode, to thereby lessen the need for maintenance. In order to achieve the desired effect at the electrodes, it is sufficient to have separators or non-woven fabrics of relatively weak layer strengths, which are held in their positions by means of spacers. For this purpose, ribs or other normally installed elements can be attached to the separators.

For the maintenance-free operation of a accumulator according to the invention, the basic elements of the active materials, their supporting framework, as well as all metallic connections on the interior of the cells, are of hi-purity lead or hi-purity lead alloys that are free from antimony or other alloy elements that reduce the hydrogen overloading at the negative electrode.

The electrolyte consists of chemically pure, diluted sulphuric acid, the concentration of which meets the operating requirements for the given application of the accumulator. The gel phase of the electrolyte contains in addition the gel former, which consists of highly disperse, pyrolytically produced silicic acid, the size of whose particles ranges from 0.01 to 0.02 microns. For the development of a thixotropic gel according to the invention, a lower limit of 4.5 weight percent is required, which, according to the demands placed upon the solidity of the gel, can be increased to 14.0 weight percent.

In a further advantageous embodiment of an accumulator according to the invention, the electrolyte contains, relative to the weight of the affected positive active material, 2 to 5 weight percent of phosphoric acid, preferably orthophosphoric acid. In the case of accumulators that are designated exclusively for charging and discharging operations, and of whose cycle integrity much is demanded, the positive electrodes, in connection with the addition of phosphoric acid are covered with large pored non-woven fabrics instead of capillary-active non-woven fabrics, or are left entirely uncovered. In this manner, the phase shift from the gel phase to the liquid electrolyte relates to the pore entrances of the positive active material. The resulting loss of performance of the positive electrode is more than compensated for by an extraordinary extension of the cycle lifetime.

The accumulator according to the invention is not only leakproof, maintenance-free and cycle secure, it is also so designed so that filling with a temporarily liquid gel as an electrolyte can take place independently of the dimensions and surface extension of the electrodes. The connected filling process begins in preassembled accumulators, the electrodes of which have already been brought into an electrochemically active state, and to which, for the purpose of carrying out the process, are assigned capillary-active separators according to the invention. In this regard it is of no consequence whether the transformation of the electrodes takes place in the housing of the accumulator or in separate cells or whether the electrodes are still covered with the processing acid or have been subjected to a drying procedure after the forming process.

The pouring in of the loaded electrolyte consisting of two different phases into the accumulator cells takes place according to the invention in two separate steps, the first of which consists of completely impregnating the pores of the active material in the electrodes as well as the pores of the separators assigned to the electrodes with the liquid and gel-free electrolyte phase. Should the electrode pores still contain forming acid, this acid must be replaced by the poured-in electrolyte with a predetermined consistency. In the presence of dry electrodes, the filling electrolyte is to be poured in only until the electrodes have been completely covered. In this regard, impregnating is facilitated by the brief evacuation of the accumulator housing, in order to prevent the formation of gas pockets in the pores. Thereafter, the excess filling electrolyte is again completely removed from the accumulator housing by pouring out or by other means, whereby the pores of the active materials and the capillary-active zones of the separators remain filled with the gel-free phase of the electrolyte.

The second step of filling up is to fill the electrolyte space with the second phase of the electrolyte, which is in the form of a thixotropic gel. By electrolyte space is understood the entire area remaining within the accumulator cell, particularly that space between the electrodes, which although it is filled to a predetermined height, is not included with the electrodes themselves that include the separators assigned to them and the liquid phase of the electrolyte. For the purpose of pouring-in, the thixotropic gel that consists primarily of sulphuric acid and a gel former, is first temporarily liquefied in a conventional manner and in this state poured immediately into the cells of the accumulator. In this regard, the gel, despite its liquid character, penetrates not at all or very little into the already filled pores of the separators assigned to the electrodes. Hence, a further advance of the gel up to the pore entrances of the active material is prevented, unless for the purpose of improving the cyclical integrity by the addition of phosphoric acid, the arrangement of a suitable separator to the positive electrode has been dispensed with. Because during the filling process, electrolytic liquid can neither be fed into nor retrieved from the gel, the flow paths of the gel are determined solely by the length of time taken by the gel to resolidify. The time required for resolidification may, according to the invention be varied and extended, so that accumulator cells with any size of electrode can be filled. This is achieved according to the invention, that in the thixotropic gel phase of the electrolyte, the concentration of sulphuric acid is accordingly reduced and in the liquid phase of the electrolyte is increased to the extent that after a concentration equilibration, the intended working concentration obtains throughout the entire electrolyte. The equilibration of concentration is effected and speeded up by a discharge and subsequent loading that begins immediately after the filling process. Because in this way the more highly concentrated liquid phase of the electrolyte can act upon the electrodes for only a relatively short period of time, the employment of very high sulphuric acid concentrations is still possible, for example, in the 50-60% range; these are no longer suitable for lead accumulators because of the damage they cause. Because the equilibration in concentration between the capillary-bound electrolyte and that present in the electrolyte space can occur only by means of diffusion, the flow paths of the gel are little influenced by the high sulphuric acid concentration in the liquid phase of the electrolyte and surprisingly does not result in layering of the acid density.

In order to lengthen the life of the positive electrodes, especially to improve their cyclical integrity, phosphoric acid is added to the electrolyte, and at the same time, the assignment of capillary-active separators to the positive electrode is dispensed with, or wide-pored non-woven fabrics are installed, which permit the still liquid gel to penetrate. The phosphoric acid can be added to the liquid phase as well as to the gasiform phase of the electrolyte, of which it is preferable to make the addition to the liquid phase.

The invention is explained as follows by means of a short example:

The example is that of a cell for industrial batteries of normal commercial size, as commonly used in the field of electrotraction. The housing consists of polypropylene and is closed by means of a welded-on cell cap of the same material and an opening for filling purposes. Electrical connections lead through the cell cap and are gas-and-electrolyte tight. The positive electrode consists of three 19 part tube plates with an installed length of 315 mm, which together with the pole bridge are welded onto the cell pole into one unit. The negative electrode is analogously constructed, but consists of four lattice plates of a suitable size. Mass supports, pole bridges and poles consist of antimony-free lead alloys. To the lattice plates of the negative electrode are arranged 0.4 mm thick formed fibreglass, which due to their nature are capillary active, i.e. are capable of soaking up and retaining liquid electrolyte. For spacers, placed-on ribs can be employed, or holed and ribbed stiff plastic sheets.

The total volume of the operating electrolyte of the cell is 2.5 liters. The cell complete with dry, charged electrodes is filled to the upper allowable limit with diluted sulphuric acid of 1.395 density at 20° C., or 50% diluted. After a brief evacuation to remove trapped air or gas bubbles, the excess acid is removed by pouring out. In the pores of the electrodes and separators remain 1.2 liters of the poured-in acid. In order to fill the still empty electrolyte space is employed a thixotropic gel of diluted sulphuric acid at a density of 1.16 at 20° C. with the addition of 12 weight percent of a pyrogenically produced silicic acid having an average particle size of 0.012 microns, that after pre-liquefaction can be easily poured without bubbles. After a short rest period, the cell is discharged with a 5 hour discharge current to 80% of its rated capacity. In consequence, the gel solidifies and retains its solidity after reloading. The density of the acid in the gel phase of the electrolyte and also in the pores remains at 1.27 and hence corresponds to the required operational acid density. By operating one of the valves in the filling opening that open only outwardly, the cell is ready to be used.

In order to improve the integrity of the cycle, before filling, approx. 75 g of an 85% solution of orthophosphoric acid is added to the electrolyte in its liquid phase in relation to its total volume of 2.5 liters. This corresponds to approx. 25.5 g H3PO4/Liter, or, rather, in relation to the weight of the electrolyte in the loaded state of the cell, 2%.

The embodiments of the invention in which an exclusive property or privilege is claimed are defined as follows:

1. Method for the production of a lead accumulator with a thixotrophic gel as an electrolyte that consists essentially of sulphuric acid and a gel former, comprising the steps of:
   (a) impregnating the pores of active material in the electrodes and the pores of the separators that are arranged in relationship to the electrodes with a first electrolyte solution consisting essentially of sulphuric acid-based electrolyte that is free of gel former and which possesses a higher concentration of sulphuric acid than that which is present in the entire electrolyte after an equilibration of the concentration, and then;
   (b) filling remaining free spaces between the electrodes including the remaining electrolyte spaces with a second electrolyte solution consisting essentially of sulphuric acid and a thixotropic gel former wherein said second solution possess a lower concentration of sulphuric acid than that which is present in the entire electrolyte after equilibration of the concentration.

2. Method according to claim 1 characterized in that the concentration of sulphuric acid in both portions of the electrolyte are chosen such that after a concentration equilibration of both electrolytes throughout the entire electrolyte in the loaded state of the accumulators, the normal working concentration for a given application, is reached.

3. Method according to claim 1 characterized in that the sulphuric acid concentration in the second portion of the electrolyte is so low that for the purpose of filling it can be liquified, and the concentration of the gel former is so high, that after equilibration of the concentration of the sulphuric acid a solid gel is formed that cannot be liquified by mechanical intervention.

4. Method according to claim 1, characterized in that as a gel former, a pyrogenically produced, highly disperse silicic acid, the size of whose particles range between 0.01 and 0.1 microns, preferably between 0.01 and 0.02 microns, is employed.

5. Method according to claim 1, characterized in that the pores of the active materials and the electrolyte contained in these pores, are free of gel formers.

6. Method according to claim 1, characterized in that the entire electrolyte, in relation to its weight in the loaded state of the accumulator contains approx. 2 weight percent of orthophosphoric acid, and in relation to the weight of the related positive mass, from 2 to 5%.

* * * * *